United States Patent [19]
Tesch

[11] Patent Number: 4,495,235

[45] Date of Patent: Jan. 22, 1985

[54] PROCESS FOR THE PREPARATION OF FIBER-REINFORCED FLAT BODIES CONTAINING A HARDENABLE BINDER

[76] Inventor: Guenter H. Tesch, 22, Rte. de la Heitera, Fribourg, Switzerland, CH 1700

[21] Appl. No.: 402,086

[22] Filed: Jul. 26, 1982

[30] Foreign Application Priority Data

Jul. 27, 1981 [DE] Fed. Rep. of Germany ....... 3129509
Jan. 29, 1982 [CH] Switzerland .......................... 550/82

[51] Int. Cl.[3] ............................................. B32B 3/10

[52] U.S. Cl. ..................................... 428/137; 156/46; 156/148; 156/268; 428/131; 428/280; 428/281; 428/282; 428/283; 428/284; 428/286; 428/300; 428/331; 428/234; 428/703

[58] Field of Search ..................... 156/42, 45, 46, 148, 156/154, 222, 268; 428/68, 71, 87, 131, 137, 138, 234, 235, 233, 300, 331, 703, 284, 286, 280, 281, 282

[56] References Cited

U.S. PATENT DOCUMENTS 4,056,655 11/1977 Faille et al. ........................ 428/703

*Primary Examiner*—James J. Bell
*Attorney, Agent, or Firm*—Bacon & Thomas

[57] ABSTRACT

A process for the preparation of fiber-reinforced flat bodies containing a hardenable binder is described, wherein a core layer containing the prepared, unhardened (liquid) binder is placed between a cover layer and a backing layer; in order to provide this three layer body with its own internal cohesion even in the unhardened condition and to improve the mechanical properties of the body in the hardened state, the three layers, at least one of the outer ones of which consists of fibers capable of active fiber bonding, are needle bonded together prior to the hardening of the binder, so that the layers will hold together in the deformable state, whereupon the binder is hardened, while the fibers provide the body with an elasticity different from that of the hardened core layer. Prior to hardening, the composite body may be provided with orifices or slits, without the loss of the mass of the core layer from the body. The mass of the core layer is held by holding fibers, introduced during the needle bonding process and connecting the cover layer with the backing layer through the core layer.

33 Claims, 9 Drawing Figures

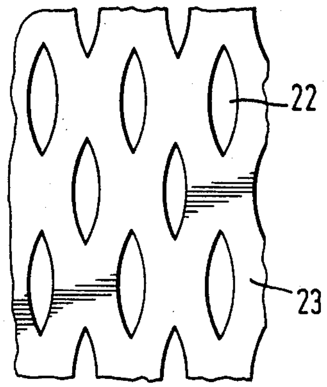
Fig. 4
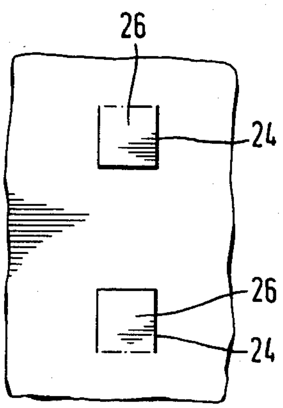
Fig. 5
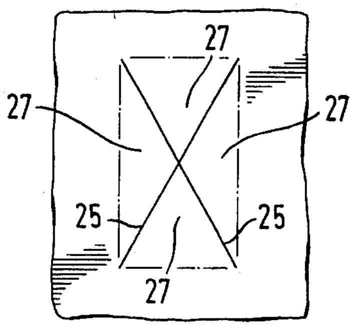
Fig. 6
Fig. 7a
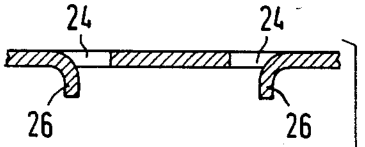
Fig. 7
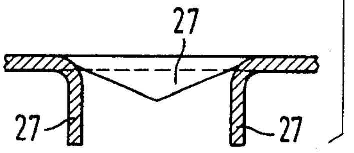
Fig. 7b
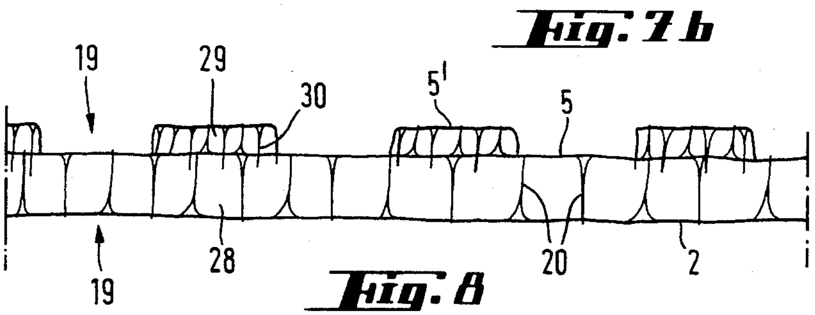
Fig. 8

PROCESS FOR THE PREPARATION OF FIBER-REINFORCED FLAT BODIES CONTAINING A HARDENABLE BINDER

The invention concerns a process for the preparation of fiber reinforced flat bodies containing a hardenable binder retained between a backing and cover layer.

In DE-OS No. 30 19 917 different processes for the production of fiber reinforced gypsum plates are described.

With reference to Great British Patent Specification No. 772 581, a process is described whereby a fiber glass fabric is passed through a gypsum slurry, a layer of the slurry is placed on it and a second saturated fiber glass fabric applied to the layer of the slurry, whereupon the composite formed in this manner is hardened. According to another process, twisted mineral fibers are used instead of the paper cladding previously used.

In a third process for the preparation of gypsum plates or board, a slurry of gypsum is placed on a strip of inorganic fibers on a conveyor belt, a second strip of the same fibers is place on top and the assembly compressed between rolls so that the slurry enters the fibrous strips at the surfaces of the slurry mass. According to a further process described therein, a multilayer gypsum plate is prepared by cladding a core of gypsum and reinforcing fibers on one side with a strip of a fiber glass fleece or cardboard, and on the other side with a fiber glass or a strip of fiber glass fleece, cardboard, film or paper.

According to DE-OS No. 30 19 917, all of these processes have the disadvantage that the gypsum slurry does not fully penetrate the two outer layers or does not fully saturate them. It is therefore proposed in DE-OS No. 30 19 917 to apply the gypsum slurry to a permeable web, in particular a web consisting of glass fibers, place a second web on it and to vibrate this three-layer body, whereby the slurry is made to penetrate the web and a thin, continuous layer is formed on the outer surface of the web.

It is common to these known processes that prior to hardening the composite has no internal coherence and that in particular the layers may slide with respect to each other. For this reason, the sheet like composite structure must be supported by a carrier while being moved and stored horizontally until the gypsum hardens. It is further not possible to shape an unhardened composite of this type, as the slurry core layer becomes nonuniform, especially in its thickness. Moreover, the adhesion of the two outer layers to the core layer is not very high even in the hardened state, whereby, if such a plate is stressed in bending, the elongated outer layer separates from the core layer and cracks thereby destroying the fiber reinforcement, which in turn leads to the failure of the core layer.

It is therefore an object of this invention to provide an improved process of the aforementioned general type, wherein the three layers have their own internal coherence even in the nonhardened state, while leading the hardened state to improved mechanical properties of the three layered or composite body.

This object is attained by an improved process of forming a fiber-reinforced three layer composite body having outer layers and a hardenable core layer comprising a binder, by needling at least one outer layer comprising fibers which are capable of active needling, to needle bond each with each other prior to the hardening of the binder so that the layers are held together in the deformable state and when the binder hardens, the fibers alter the elasticity of the hardened core layer. The process of needle felting or needle bonding known in the textile industry is used in this process.

In the so-called needle felting process, individual fibers or bundles of fibers are taken from a fiber containing layer placed on another layer and are inserted into the other layer by means of needles equipped with barbs. The fibers remain in the second layer upon the withdraw of the needles thereby establishing a connection of the fiber containing layer with the other layer.

A precondition for the use of the method of needle felting is thus the existance of a layer of substances "capable of active-needle bonding", i.e. a layer consisting of fibrous aggregates suitable for needle bonding or containing such aggregates. The other layer, into which the actively needle bonding fibers are inserted, must be at least capable of passive needle bonding, i.e. it must be able to hold the inserted fibers.

Such a passively needle bondable layer may itself be actively needle bondable, but the passively needle bondable layer may also consist in a known manner of synthetic plastic sheets, paper or the like. It has now been suprising discovered that hardenable, highly viscous masses, such as hardenable cement, concrete, gypsum or lime masses, hardenable or vulcanizing viscous bitumen masses or viscous, hardenable synthetic resin masses, or the like, are also passively needle bondable.

It is further possible to introduce a mass of a synthetic material in the dry powder form, for example one or both components of a two-component system, in particular two-component powders, as the core layer and either introduce the second component in the liquid or the gaseous form after the needle bonding and/or effect the hardening after the needle bonding with heat and/or under pressure.

By means of the needle bonding of the unhardened composite structure consisting of individual layers and core layer, a plurality of holding fibers may be inserted in a relatively high density into the composite structure. Additional parts of these masses are introduced by the vibration inherent in the needle bonding process in the needle machine from the core layer into the layer containing the fibers, without the need for vibrators. Fillers which may be present in the core layer, such as sand, polystyrene pellets, granulated rubber waste or the like, are prevented from entering or penetrating the outer layers.

The mat shaped composite body formed in this manner has its own internal coherence and may be handled and freely suspended without a carrier or support surface. In the unhardened state such a planar composite body may be aligned vertically and may then be wound for example around a steel or wooden support already installed in a structure and possibly nailed or screwed to it. It is also possible to attach such a sheet like composite body to a bare concrete surface, whereupon the composite structure, attached as a plaster substitute, will bond itself to the surface and harden thereon.

It would be assumed that as the result of the needle bonding of the holding fibers through the core layer weak locations would be present in the hardened composite body, however, it has been surprising discovered that a composite body prepared according to the process of the invention has mechanical properties, especially with regard to impact strength, the ability to absorb work and elongation, which are at least equivalent to those of the composites made by the known processes and even exceed them in part.

It has been determined in investigations that if the known composites are stressed in bending, the outer layers separate from the core layer and the body fails at the point of the highest strain. In contrast, in the case of the composites prepared by the process of the invention, such a separation of the outer layers from the core layer does not take place, even with high degrees of bending. The center core layer, containing the binder and possibly the fillers, is penetrated by holding fibers taken from at least one of the two outer layers containing fibers and binders. That is, they are solidly incorporated in the core layer and other layer, following hardening and the bonding of a binder. The holding fibers provide a joining of the three layers with each other, which is very difficult to break and whereby the mechanical properties of all three layers are utilized.

A hardened, bonded planar body made by the process of the invention having mechanical properties that are as good or even better than those of fiber reinforced plates made by the conventional processes is obtained even though in the process, as the actively needle bondable fibers, in the form of individual fibers, filaments or threads, but also as loose spunbonds, for example conventional synthetic fibers of polyester, polyamide, ploypropylene or the like, or natural fibers, such as sisal, linen, cotton or the like, are used.

The second outer layer, which must be at least passively needle bonded, may consist of the same fibers, but a woven or knit fabric, a spunbond, synthetic plastic or paper sheets, or the like, may also be used.

While the development of glass fiber reinforced concrete and fiber cement is directed at an increasing equalization of the elastic moduli of the fibers and the concrete mixtures, it was found that such a combination is not necessary when the process of the present invention is used, wherein fibers are employed which are many times longer than the individual fibers used heretofore.

Particularly favorable mechanical properties may be obtained, if the needle bonding is effected not perpendicularly to the flat surface of the body as is customary in the textile needle felting method, but obliquely to it. Flat bodies containing hydraulic binders tend in the case of excessive bending stresses to fail in planes perpendicular to the plane of the body. If the holding fibers are aligned perpendicularly to the plane of the body, there is a danger that such fracture planes will be formed along a row of holding fibers. In case of an oblique arrangement of the holding fibers, especially when inserted from two sides at an angle of 45° and located in a skewed manner with respect to each other the holding fibers contribute to the inhibition of the crack formation which preceeds fracturing.

The needle bonding of the three layers results in the fact that the unhardened mass of the core layer is not only held between the two outer layers but is essentially prevented from shifting in the principal plane of the body. This makes it feasible to produce in the as yet unhardened body, transversely to its principal plane, orifices, such as punch-outs, slots or the like, without the risk of the loss of appreciable amounts of the core layer from the body, while the mass is being retained by the holding fibers.

If the body is equipped with a plurality of slits in parallel rows, with the slits of adjacent rows being offset with respect to each other, the needle bonded body may be stretched transversely to longitudinal the direction of the elongated orifices. Such a body is highly flexible in the unhardened state, whereby it adapts itself with particular ease even to large irregularities of another object to which it may be applied.

This ability to "elongate" may also be utilized to stretch the body in the unhardened state, by further opening the orifices or slits, whereupon the body then hardens in this open condition. Plates with such enlarged orifices, which in appearance closely resembles the known expanded metals, may be used to cover air shafts or the like, or as fencing elements, screens, etc. They are particularly suitable for use as snow or sand, barriers, since air loaded with sand or snow releases the sand or snow upon passing through such lattice like bodies due to the sudden change in the conditions of the flow.

If the not yet hardened composite body has a plurality of orifices or slits connected with each other and enclosing an angle, the tab like parts or sections of them located between the orifices may be bent out of their plane. Such tabs may serve after the hardening of the body, for example as holding tabs, which by virtue of their elasticity may be nailed, or they may enter the loose soil when these bodies are placed as plates on sand or humus soil, whereby the bent tabs prevent the shifting of the plates.

This bending of the tabs may also be effected by punching, i.e. the application of the orifices and the bending of the tabs is performed in a single work step.

As the result of the internal coherence of the needle bonded but as yet unhardened composite body, it is possible to deep draw in a dye such an unhardened, needle bonded body, especially when equipped with orifices or slits.

According to a preferred embodiment of the invention, at least one surface of the unhardened composite body is structured, preferably the surface which later, for example after installation of the body in a building or the like, remains visible from the outside. Such a structuring may be effected by form calendering or embossing, but as the result of the internal coherence of the needle bonded composite body it is also possible to rough the surface of the body during the hardening process with a brush or to draw individual fiber ends from the layer containing the fibers. The structure of the surface may further be altered by varying the consistency of the core layer mass to be applied, since depending on the viscosity of this mass, larger or lesser amounts of the binder pass into and through the layer containing the fibers, i.e. in the case of the application of a relatively high viscosity core layer less of the binder reaches the outer surfaces of the composite, whereby the textile character of the outside of the body may be preserved. Furthermore, if the fibers employed are colored, such a plate like body, used for example as a wall element, requires no further processing. By reducing the viscosity of the core layer applied and by calendering after needle bonding of the layers, enough of the binder may be caused to penetrate through the outer, fiber containing layers so that said layers will be completely enclosed by the binder, such as cement, gypsum, lime, latex, rubber, hot melt, bitumen, synthetic resins or the like, and essentially no fibers will be visible on the surface of the hardened body. To this extent the hardened body containing cement resembles for example, the known objects of asbestos fiber concrete. A further mode of structuring consists of applying to an entirely flat, needle bonded but as yet unhardened body, a second composite body in patterns, for example as strips, points or the like, and to join it to the first body by needle bonding. This makes it possible to develop particularly raised structures.

Two or more entirely flat, unhardened composite bodies may be placed upon each other and needle bonded, whereby a body may be given a multiple thickness, which has an internal coherence even prior to the bonding of the binder.

Similarly, glass wool or rock wool or foamed plastic mats may be joined with fully flat, unhardened composite bodies, wherein the holding fibers are inserted by means of needles from the composite into these mats or plates. If such a mat or plate is covered on both sides by the composite, the sandwich type object obtained in this manner may be used for example as a partition. Since such mats or plates, as seen from the foregoing, are passively needle bondable, they may be used even at the beginning as the passively needle bonded backing layer for a composite body.

According to a special form of embodiment of the invention the composite body is shaped prior to bonding and hardening, for example as a gutter, and needle bonded as such.

Examples of the embodiment of the invention will be explained hereinafter with the aid of the drawing.

In the drawing:

FIG. 4 is a schematic top view of a segment of a composite body equipped with open slits;

FIGS. 5 and 6 are two possible configurations of interconnected orifices, the sections thereof forming tabs between them;

FIG. 7 is a cross section of a composite body according to FIGS. 5 and 6 wherein the tabs are bent out of the plane of the composite body;

FIG. 8 is a flat composite body with strip like composite bodies needled to it and FIG. 9 is an insulating plate, with composite bodies prepared according to the invention needled to it on both sides.

Figure 1:
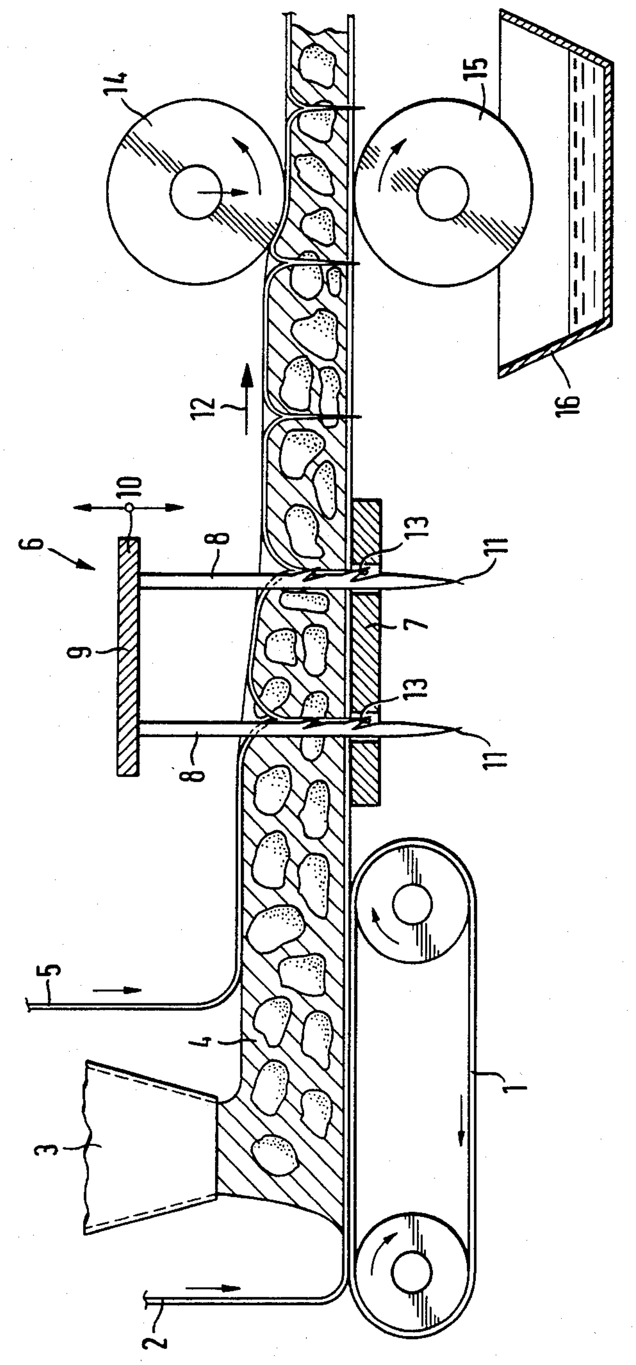
FIG. 1 is a schematic view of an installation for an embodiment of the process.

According to FIG. 1, a backing layer 2 is placed onto a conveyor installation, here a conveyor belt 1, upon which the core layer 4, is metered out and placed thereon by a feeder device 3. Actively needle bondable fibers, here in the form of a fibrous fleece 5, are placed on the core layer 4, and the three-layer system is conveyed to a needle machine 6.

Needle machine 6 is known from the textile needle felting technology (see for example Krčma, "Textile Composite Materials", p. 139-141). In the needle machine 6, the system to be needle bonded, here the three-layer system, is guided over a base plate 7 provided with bores. Above the object to be needle bonded, a needle board 9 carrying the needles 8 is arranged, the needle board continuously moving up an down (double arrow 10) far enough so that usually the needle points 11 completely penetrate the object to be bonded in their lowest position, while in their uppermost position they are not in contact with the object. In this uppermost position the object, here the three layer system, may be displaced cyclically in the advance direction (arrow 12), while during the needle process itself it must be stationary. The needle bonding needles 8 are provided at their shaft with at least one—here two—barb 13, whereby they grip individual fibers or bundles of fibers and draw them into or through the object to be bonded. Upon retraction of the needles 8, the fibers or fiber bundles entrained are released from the barbs 13 and remain in the passively needle bonded layer, here the backing layer 2 and the core layer 4.

While in the needle process of the textile industry, in the production of needle felt carpets with a final thickness of for example 4–6 mm, the needle boards have a plurality of densely arranged needles and are moving at a velocity of for example 700 strokes per minute, in the needle bonding of layers containing binders that have not yet set and which contain filler particles, such as sand particles or granulated waste rubber or the like, the density of the needles 8 in the needle board 9 is increased and the number of strokes greatly reduced.

If these criteria are satisfied and the fresh core layer is provided with the correct consistency, as will be described hereinafter, a layer containing filler particles may also be needle bonded passively. The binder that has not yet set, acts on the surface of the filler particles as a lubricating and sliding agent, whereby the needle points may slide along the grain surfaces, while the particles inside the layer may move slightly in the lateral direction.

As seen in FIG. 1, the thickness of the three layer system is reduced during needle bonding, as first the layer 5 containing the fibers is densified by needling and second the layer 5 and, depending on the configuration, the backing layer 2 also, are drawn or pressed into the border areas of the core layer.

According to the form of embodiment of the installation for execution of the process of the invention, the needle bonded composite body is guided between two calender rolls 14 and 15, effecting a further densification of the composite, whereby in particular the air and excess water or solvent contained in the core layer are squeezed out. To capture the excess water or solvent, a receptacle 16 is provided and another may be placed under the base plate 7 of the needle machine 6. The two calender rolls 14 and 15 are pressured toward each other while passing the composite between them and exerting a pressure of 2–5 bar/cm$^2$ on it.

Figure 2:
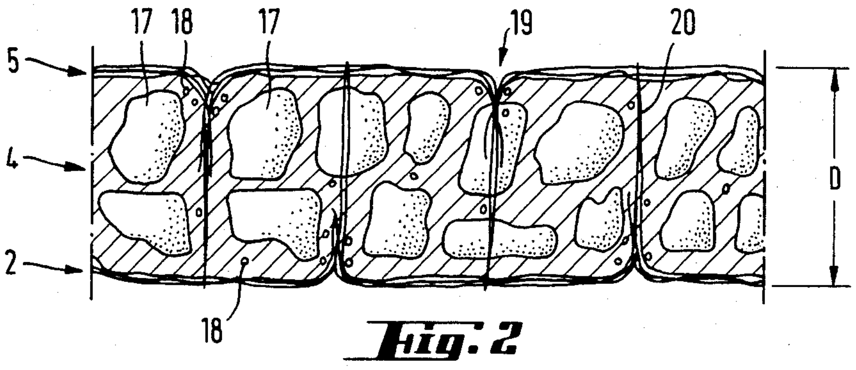
FIG. 2 is a schematic view of a cross section through a needle bonded but not hardened composite body.
Figure 3:
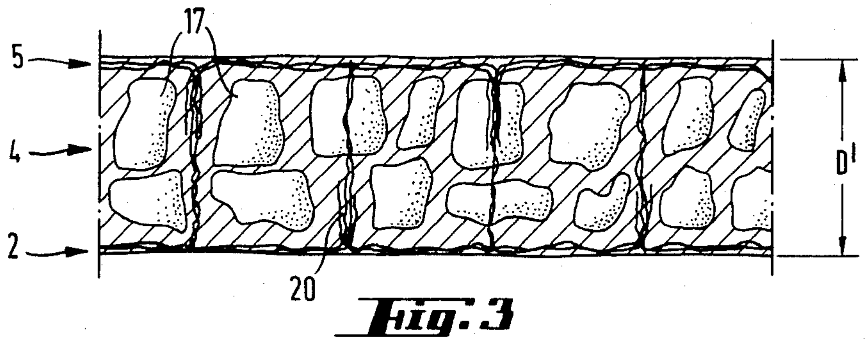
FIG. 3 is a schematic view of a section through a needle bonded and calendered composite body.

FIG. 2 and 3 show, enlarged and schematically, a section through a needle bonded composite body, with FIG. 2 displaying the state after needle bonding but prior to calendering and FIG. 3 the state after the additional calendering. An actively needle bonding fiber fleece is used as the backing layer 2 according to FIG. 2 and 3, it corresponds to the fiber fleece 5 of the cover layer. The core layer consists of filler particles 17, which are encapsulated or surrounded by the binder. Furthermore, individual air bubbles 18 may be seen in FIG. 2; they are found particularly in the area of entry of the needles 8. Around these points of entry "fiber funnels" 19 are formed. Fiber ends or parts of fibers not gripped by the barbs 13, may be drawn partially into these fiber funnels 19. The binder contained in the core layer 4, indicated by the shading in FIG. 2 and 3, surrounds both the individual particles 17 and the holding fibers 20 so that in actual practice, if a hardened composite body is sectioned, fewer particles 17 and holding fibers 20 are seen, than shown in the drawing. This is especially true for the holding fibers 20, which in order to render the fracture of a hardened composite body more difficult, are distributed nonuniformly over its surface and as the result only a very few fibers are seen in a section in actual practice.

As mentioned hereinabove, the thickness D' of the composite body after calendering (FIG. 3) is less than the thickness D prior to calendering (FIG. 2). Further alterations of the composite body effected by calendering are clearly seen by a comparision of FIGS. 2 and 3. Thus, the air bubbles 18 are removed by calendering, the binder has penetrated the two outer fiber layers 2 and 5 and has also entered the fiber funnels 19. The holding fibers 20 connecting the outer layers 2 and 5 are present here in a verticle form; they are bonded in this form upon the setting of the binder. Whether the holding fibers are in the verticle form, depends on the type of fiber chosen and also on the permanent alteration of the composite by the calendering.

FIGS. 1 to 3 shows a core layer which in addition to the unbonded and thus still liquid binder, such as cement, gypsum, lime, latex, rubber, hotmelt, bitumen or synethetic resins, also cotains fillers 17, such as sand grain, foam pellets, granulated rubber, such as waste rubber, or the like.

In other forms of embodiment, these fillers are eliminated, i.e. the core layer 4 consists only of the binder, with the mass of the binder being applied to the backing layer 2, the binder subsequently bonding the backing layer 2, the cover layer 5 and the holding fibers 20.

FIG. 4 shows a top view of a composite body, in the shape of the known, so-called expanded metal. For this purpose, the needle bonded but not hardened composite body is provided with slits 22 arranged in parallel rows, with the slits of adjacent rows being offset with respect to each other. The distance between two adjacent rows of slits located on the same line here correspond approximately to the thickness of the composite body, while the distance between two slits 22 in the same row is approximately twice the thickness of the body and the length of the slits approximately three times the thickness of the body. Prior to the hardening of the slitted composite, the layer is extended transversely to the direction of the slit, so that the slits 22, as shown in the drawing, are deformed into lens shaped orifices and are finally hardened in this state. The webs 23 remaining between the individual orifices are slightly raised in the process, so that the cross section of the slits parallel to the plane of elongation of the body is different in different positions. By virtue of this fact, the orifices 22 are forming narrowing or expanding nozzles in the composite body, whereby the flow conditions of air flowing through such a composite body are altered.

A composite body of this type is especially suitable for use as a sand or snow barrier.

According to another embodiment of the invention, not shown, the distance between two rows of parallel slits and the distance between two slits of a row is approximately three to five times the thickness of the composite body, while the length of individual slits 22 is about two to three times the aforementioned distance. A composite body of this type was expanded transversely to the longitudinal direction, thereby opening the slits 22 and then calendered. This resulted in lens shaped orifices 22 with a constant cross section over the entire thickness of the composite body; their opening edges were as smooth as if they would have been punched from the hardened body.

While there is no loss of material during the slitting and subsequent expansion of the composite body, according to another form of embodiment of the invention the orifices 22 are punched out in the shape desired, either as lenses as in FIG. 4 or circular (not shown). The cross section of the punched orifice remains constant over the thickness of the material.

In the form of embodiment of the composite body according to FIG. 5, U shaped slits are made. According to the configuration of FIG. 6, two crossed slits 25, forming an "X" are provided. Between the slits 24 and the sections of the slits 25, a tab 26 or four tabs 27, remain. These tabs are bent out of the expansion plane of the body in a further work step. This feature is shown in FIG. 7 by a cross section through the body.

In place of the slitting and subsequent bending of the tabs 26 and 27, according to a further form of embodiment of the process, the tabs are bent out and over in a single working step.

FIG. 8 shows a first, flat composite body 28, to which in the not yet hardened state additional composite bodies 29, needle bonded but not hardened, are bonded in the form of strips. The flat composite body 29 is needle bonded from both sides, as demonstrated by the fiber funnels 19 and holding fibers 20. For the sake of clarity, the core layer located between the backing layer 2 and the cover layer 5, corresponding to the core layer of FIG. 2, is not shown.

The additional, strip-like composite bodies 29 correspond in their configuration to the flat body 28, but their thickness here is only one-half of that of the composite 28.

The strip like composite bodies 29 are placed in spaced apart relationship on the flat composite body 28 and needle bonded to it, with the needles entering from the cover layer 5' of the composite strips 29, taking the holding fibers 30 from this layer 5' and inserting them both through the backing layer of the strips 29 and the cover layer of the flat composite 28 and into the core layer of the latter.

According to another embodiment, not shown, by the process described in FIG. 8, two or more identical, flat composite bodies 28 may be placed on each other and needle bonded. By the multiple placing on each other of composite bodies 28 and their needle bonding, even through two composite bodies 28, a composite of any thickness may be produced.

In place of the strip shaped composite 29, to be needle bonded to the flat composite 28, pattern forming composite bodies with different surfaces, e.g. circular or square, may be bonded to the composite 29, depending on the desired structure of the finished product.

Figure 9:
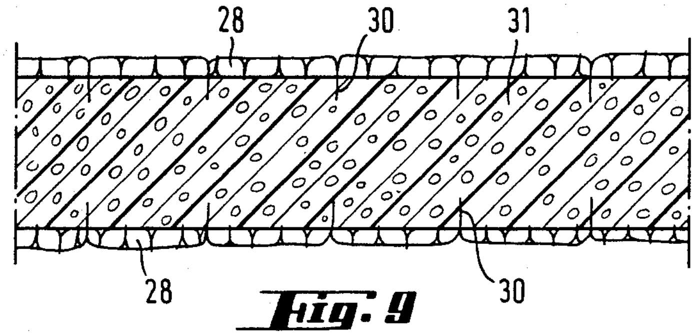

FIG. 9 shows a cross section through a plate of a sandwich like configuration, the core of which consists of a foam plate 31, to both surfaces of which flat composite bodies 28, corresponding to FIG. 8 are needle bonded by means of the holding fibers 30. If the backing layer 2 of the composite 28, not previously calendered, is placed on the foam plate 3, the finished product may be used as a partition or the like in buildings, without further treatment, with its surface having the appearance of the needle felted carpet. This is particularly apparent when colored fibers are used in the cover layer 5 of the composite body 28. By the insertion of the holding fibers 30 from the composite 28 into the foam plate 31, further structuring is obtained, if the fiber funnels formed are not filled with the binder.

The composition and configuration of certain composite bodies according to the process of the invention are illustrated in the following examples.

EXAMPLE 1

A fleece of polyester fibers with a specific surface area weight of 200 g/m$^2$ and a titer of 17 dtex on a Bafatex support with a specific surface area weight of 25 g/m$^2$ was laid down to prepare the cover layer and the identical backing layer and the two were prebonded by needle felting with a stitch density of 48 stitches/cm$^2$.

For the core layer, 10 parts by weight of Portland cement, 10 parts by weight construction sand with a grain size of 0.1. to 1 mm, 5 parts by weight water and 1 part by weight Vinnapas RE 926 Z, were mixed together.

This mixture was uniformly distributed with a specific weight of approximately 9.3 kg/m$^2$ on the backing layer and covered with the cover layer.

This three layer system was needle bonded in needle machine from both sides, with a stitch density on each side of 24 stitches/cm$^2$. The bonded composite body was pressed in a press at a pressure of 40 N/cm$^2$ for 48 hours and hardened within 20 days at room temperature.

By this process, a 4 mm thick plate was obtained, representing on the outside an extensively homogeneous fiber reinforced concrete body, having a three layer inner configuration, i.e. a sand concrete layer containing the holding fibers between two outer fiber reinforced concrete layers.

EXAMPLE 2

To prepare the cover and the backing layer, a polypropylene fleece with a specific area weight of 80 g/m$^2$, a titer of 17 dtex and staple length of 90 mm, was laid on a Bafatex support with a specific area weight of 25 g/m$^2$ and again prebonded with a stitch density of 48 stitches/cm$^2$. The core layer had the same composition as the core layer of example 1, with the needle bonding, pressing and drying effected as in Example 1.

A three-layer body was again obtained, having a configuration and appearance similar to that of Example 1. The bending strength of the second pattern, however, was only $\frac{3}{4}$ of that of the first pattern.

EXAMPLE 3

To prepare the cover and backing layer, a fleece of polyester fibers with a specific area weight of 80 g/m$^2$ was laid on a Bafatex support with a specific area weight of 25 g/m$^2$. Different polyester fibers were used in the following mixture: 30 g with a titer of 4.4. dtex and a staple length of 100 mm, 30 g with a titer of 6 dtex and a staple length of 60 mm and 20 g with a titer of 15 dtex and a staple length of 76 mm. Here again, prebonding was effected with a stitch density of 48 stitches/cm$^2$.

For the core layer, a mixture of 2 parts by weight of Portland cement, 3 parts by weight of shredded paper (newsprint) and 7 parts by weight of water was used. This mixture was placed with a specific area weight of approximately 5.7 kg/m$^2$ between the two outer layers, whereupon the three layer system was needle bonded from both sides as described hereinabove. The bonded composite body was again pressed at 40 N/cm$^2$, with the press heated for the first two hours to 100° C., after which the composite was dried for 6 days. An impact resistant plate was obtained, both sides of which consisted of fibers.

EXAMPLE 4

To prepare the cover and the backing layers, a mixture of polyester fibers with a staple length of 80 mm, 60 g of which with a titer of 6.7 dtex and 20 g with a titer of 17 dtex was placed on a Bafatex support with a specific area weight of 25 g/m$^2$ and again prebonded with a stitch density of 48 stitches/cm$^2$. For the core layer, 10 parts be weight latex, 10 parts by weight waste rubber granules with a grain size of 1–4 mm, 10 parts by weight of Portland cement and 8 parts by weight water, were mixed together. This mixture was placed with a specific area weight of 8 kg/m$^2$ between the two fiber layers and needle bonded from both sides in the abovedescribed manner. The bonded composite body was dried for 18 hours at 130° C. and an 8 mm thick, elastic plate with a fibrous surface was obtained.

EXAMPLE 5

For a core layer, 17 parts by weight bitumen, 3 parts by weight latex and 12 parts by weight of rubber flour with a grain size of 0.2–0.8 mm were mixed together at a temperature in excess of 200°, placed between a backing and cover layer according to Example 4 and needle bonded in a preheated needle machine at a temperature in excess of 200°, as described above.

The abovedescribed five examples indicate that depending on the composition of the individual layers, plates of different configurations may be obtained with the process of the invention.

Where rubber is concerned, there are different possibilities for the composition of the core layer. For example, granulated waste rubber may be cold bonded with latex, rubber grains or rubber flour may be mixed with bitumen or hotmelt, or a masticized rubber mass may be used as the core layer which can be vulcanized after bonding. However, hot, thermoplastic rubber masses may also be bonded; they are cooled after bonding and adhere to the fibers. Synthetic resins, such as acrylates, mixed with sand and catalysts, may also be used; they are mixed shortly prior to their introduction and polymerize after bonding.

What is claimed is:

1. A process for the preparation of fiber-reinforced composite flat bodies containing three layers wherein a core layer containing a hardenable binder which is not hard is introduced between outer layers comprising a backing layer and a cover layer and wherein at least one outer layer is a fiber layer comprising fibers which are capable of active needle bonding, needle bonding at least said outer layer prior to the hardening of the binder so that (at least two) all three layers are held together by the fibers in the deformable state and when the binder is hardened providing the body with additional elasticity other than the elasticity of the hardened core layer.

2. A process according to claim 1, wherein the layers are needle bonded by means of holding fibers taken from the cover layer and the backing layer.

3. A process according to claim 1 or 2, wherein the holding fibers are inserted into the core layer at an angle less than 90° to the principal plane of the body.

4. A process according to claim 3, wherein the holding fibers are inserted both from the side of the cover layer and the backing layer and are skewed with respect to each other.

5. The process according to claim 1, wherein orifices, preferably slits, are punched or cut into the needle bonded composite body.

6. A process according to claim 5, wherein the composite body is provided with a plurality of slits arranged in parallel rows, with the slits of adjacent rows being offset with respect to each other.

7. A process according to claim 5 or 6 wherein the needle bonded composite body provided with elongated orifices or slits is expanded transversely to the longitudinal direction of the orifices or slits.

8. A process according, to claim 1 or 5 wherein the composite body is flat and is deformed from this plane prior to hardening.

9. A process according to claim 5 wherein the composite body is provided prior to hardening with several interconnected orifices or slits, said orifices including an angle between themselves.

10. A process according to claim 9 wherein tabs formed between the individual orifices or slits or their sections are bent out from the plane of the composite body.

11. A process according to claim 1 wherein individual surface areas of the composite body are bent out from the plane of the body prior to hardening by punching.

12. A process according to claim 1 wherein the needle bonded composite is deep drawn in a die prior to hardening.

13. A process according to claim 1 wherein at least one surface of the composite body is structured prior to hardening.

14. A process according to claim 13 wherein the composite body is calendered, in particular pattern calendered, prior to hardening.

15. A process according to claim 13 wherein the surface of the composite body is roughened during the hardening process, preferably by means of a brush.

16. A process according to claim 13 wherein during the hardening process of the composite body, individual fiber ends are drawn out from the layer or layers containing the fibers.

17. A process according to claim 1, wherein two composite bodies are needle bonded together prior to hardening.

18. A process according to claim 1, wherein at least one composite body is needle bonded to another, specifically flat body.

19. A process according to claim 1, wherein the unbonded composite body is formed into a configuration and the layers needle bonded in this configuration.

20. A process according to claim 1, wherein the core layer contains a hydraulic binder.

21. A process according to claim 1, wherein a mixture of a binder and water, preferably a mixture of the binder, a filler and water, is used as the core layer.

22. A process according to claim 21, wherein cement is used as the binder and sand as the filler.

23. A process according to claim 21, wherein gypsum or lime is used as the binder.

24. A process according to claim 20, wherein the needle bonded composite body is wetted with water.

25. A process according to claim 1, wherein the core layer contains highly viscous rubber masses.

26. A process according to claim 1, wherein the core layer contains highly viscous bitumen masses.

27. A process according to claim 1, wherein the core layer contains highly viscous synthetic resin masses.

28. A process according to claim 1, wherein the core layer contains a synthetic material mass in the dry, powder form, e.g. a component of a two-component system with a second component of this system being introduced after needle bonding into the composite body.

29. A process according to claim 1, wherein the core layer contains a synthetic material mass in a dry powder form, which contains two components of a two component system which system is reacted only after needle bonding.

30. The composite body produced by the process of claim 1.

31. The composite body produced by the process of claim 10.

32. A process according to claim 2, wherein holding fibers from each outer layer are inserted through the core layer into the opposite outer layer.

33. A sand or snow barrier comprising a fiber reinforced composite body containing three layers, a core layer of hardened binder and two outer layers, which layers are needle bonded together, said composite body containing offset rows of lens shaped orifices which form narrowing or expanding nozzles with areas of the composite adjacent said orifices, said nozzles altering the flow conditions of air containing snow or sand flowing through the nozzles.

* * * * *